United States Patent
Biller et al.

(10) Patent No.: US 8,146,852 B2
(45) Date of Patent: Apr. 3, 2012

(54) ROTATION DAMPER

(75) Inventors: Joachim Biller, Lorch (DE); Oliver Gross, Schwaebisch Gmuend-Lindach (DE); Bernd Gentner, Ellwangen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/015,697

(22) Filed: Jan. 28, 2011

(65) Prior Publication Data

US 2011/0121123 A1    May 26, 2011

Related U.S. Application Data

(63) Continuation of application No. 11/801,959, filed on May 11, 2007, now abandoned.

(30) Foreign Application Priority Data

May 11, 2006    (DE) .......................... 10 2006 021 944

(51) Int. Cl.
   *B65H 75/30* (2006.01)
(52) U.S. Cl. ..................................... 242/381; 242/422.2
(58) Field of Classification Search ............... 242/379.1, 242/381, 422.2
   See application file for complete search history.

(56) References Cited

U.S. PATENT DOCUMENTS

| 3,881,667 | A | * | 5/1975 | Tandetzke | ................... 242/384.3 |
| 5,355,979 | A | | 10/1994 | Stephan et al. | |
| 5,460,252 | A | | 10/1995 | Kosugi et al. | |
| 5,916,068 | A | | 6/1999 | Chisholm et al. | |
| 6,129,385 | A | * | 10/2000 | Blackadder | ................... 280/805 |
| 6,155,328 | A | | 12/2000 | Welfonder | |
| 6,786,511 | B2 | * | 9/2004 | Heckmayr | ................... 280/805 |
| 7,828,331 | B2 | * | 11/2010 | Jessup et al. | ................... 280/805 |
| 2004/0045398 | A1 | | 3/2004 | Hayashi | |

FOREIGN PATENT DOCUMENTS

| DE | 19505135 | 8/1995 |
| DE | 19611843 | 10/1998 |
| DE | 10231079 | 5/2003 |
| DE | 10332098 | 3/2004 |
| DE | 102005043843 | 5/2006 |
| EP | 0639727 | 2/1995 |
| FR | 1360705 | 11/1961 |
| GB | 2407143 | 4/2005 |
| JP | 04285336 | 10/1992 |
| JP | 20034078 | 1/2003 |

* cited by examiner

Primary Examiner — Sang Kim
(74) Attorney, Agent, or Firm — Tarolli, Sundheim, Covell & Tummino LLP

(57) ABSTRACT

A rotation damper, particularly for damping the rotary movement of a belt retractor shaft of a vehicle safety belt, has a housing which delimits a working space filled with a damping medium, and an element which is rotatable relative to the housing. Several pins serving as resistance elements, which extend into the working space, are provided on the element.

12 Claims, 2 Drawing Sheets

ROTATION DAMPER

CROSS-REFERENCES TO RELATED APPLICATIONS

This application is a Continuation of U.S. patent application Ser. No. 11/801,959, filed May 11, 2007 now abandoned, which claims priority to German Patent Application No. 10 2006 021 944.9, filed May 11, 2006. The present application claims priority to the aforementioned patent applications, which are incorporated in their entirety herein by reference for all purposes.

TECHNICAL FIELD

The invention relates to a rotation damper, particularly for damping the rotary movement of a belt retractor shaft of a vehicle safety belt.

BACKGROUND OF THE INVENTION

A rotation damper is known for example from DE 102 31 079 A1. Several blades are arranged inside a working space filled with a viscous medium, on a shaft which is coupled to a shaft of a belt retractor in the case of an accident. A rotation of the belt retractor shaft, which is brought about by a strong traction on the safety belt in the case of an impact, is therefore transferred to the blades and is damped due to the high viscosity of the fluid.

The invention provides a rotation damper which is distinguished by an alternative and particularly simple development.

BRIEF SUMMARY OF THE INVENTION

According to the invention, a rotation damper, particularly for damping the rotary movement of a belt retractor shaft of a vehicle safety belt, has a housing which delimits a working space filled with a damping medium, an element which is rotatable relative to the housing, and several pins serving as resistance elements, which are provided on the element and extend into the working space. In the sense of the invention, "pins" are meant to be elongated elements, preferably of cylindrical shape, the length of which is much larger than their cross-section. The element or the housing itself may be selectively coupled to the belt retractor shaft here in a case of restraint. Such a rotation damper is distinguished by a comparatively small structural space and a simple operating principle.

According to a first embodiment of the invention, the pins extend in the axial direction of the housing, whereby a particularly simple geometry is produced.

The pins are preferably arranged on the element so as to be displaceable relative to the housing. The damping effect of the rotation damper can thereby be controlled or regulated by a variation of the effective pin length before or during a case of damping.

A particularly simple development is obtained if the element has a disc on which the pins are arranged. This disc can be provided inside the working space.

A drive is preferably provided for an axial displacement of the pins relative to the housing. This drive is actuated in order to adjust the force level of the rotation damper in accordance with requirements.

Advantageously, the drive has a motion thread, for which reason a comparatively small amount of energy is sufficient to actuate the drive, in order to displace the pins axially even under load.

According to a second embodiment of the invention, the element is a shaft and the pins extend radially to the shaft. A simple, and nevertheless effective, development is again produced.

The pins may have formed-on lips of a flexible or an elastic material with an indentation arranged between them. In this embodiment, the rotation resistance, and hence the damping effect, can be increased by spreading the lips apart.

The shaft is preferably surrounded by a ring arranged inside the working space, the ring being coupled to the shaft by means of a spring element. The ring preferably has a higher mass inertia here than the shaft. When a high acceleration acts on the shaft, a rotation of the shaft relative to the ring occurs owing to the inertia of the ring; the ring therefore acts as an acceleration sensor. A restoring in the case of a decreasing acceleration is achieved through the coupling via a spring element, which may be a helical or spiral spring for example.

An adaptive damping effect, in particular dependent on acceleration, can be achieved in a simple manner in that the ring has spreading elements which can penetrate into the indentations of the pins in the case of a relative rotation between the shaft and the ring. The formed-on lips are spread apart by the spreading elements and the damping effect of the rotation damper is thereby increased.

For this purpose, the ring preferably has recesses through which the pins are guided.

BRIEF DESCRIPTION OF THE DRAWINGS

FIG. 4 shows a perspective view of a rotation damper according to a second embodiment of the invention, in which the illustration of the housing was dispensed with.

DETAILED DESCRIPTION OF THE PREFERRED EMBODIMENTS

Figure 1:
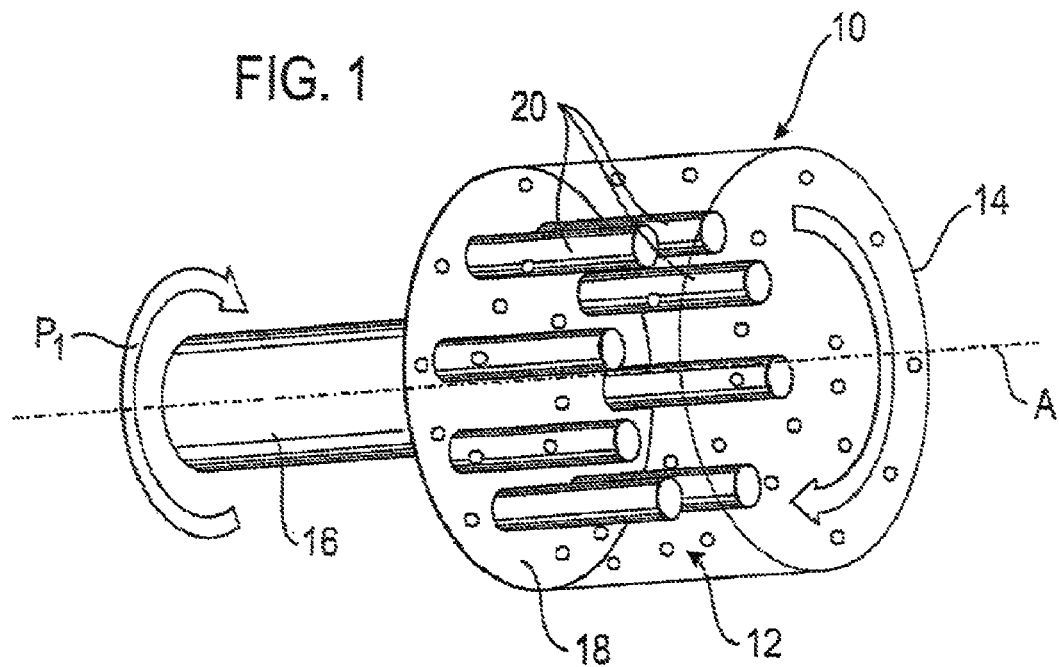
FIG. 1 shows a perspective view of a rotation damper according to a first embodiment of the invention.

FIG. 1 shows a rotation damper 10 which has a working space 12 filled with a damping medium. The working space 12 is delimited by a housing 14 which is illustrated so as to be transparent in FIG. 1. The rotation damper 10 further comprises an element, here a shaft 16, which is rotatable relative to the housing 14 and which has a disc 18 arranged inside the working space 12, on which several elongated pins 20 are arranged as resistance elements. The pins 20 extend in the axial direction A of the housing 14 and are arranged so as to be longitudinally displaceable (i.e. displaceable in particular relative to the housing) on the disc 18.

In a case of restraint, the shaft 16 of the rotation damper 10 is coupled to a belt retractor shaft for a vehicle safety belt (not shown), in order to prevent belt webbing from being able to be withdrawn from a belt spool in an uncontrolled manner. Thereby, the rotary movement of the belt retractor shaft is transferred to the shaft 16 (indicated by the arrow $P_1$), and, if the torque is sufficiently large, the shaft 16 is likewise caused to perform a rotational movement. The disc 18 and the pins 20 arranged thereon rotate with the shaft 16 through the damping medium, whereby a damping effect is achieved. Alternatively, it is equally possible to couple the housing 14 to the belt retractor shaft instead of the shaft 16.

Different damper characteristics can be set by varying the pin length, the effective diameter, the pin geometry, the pin diameter, the properties of the medium, the number and arrangement of the pins. An adjustment unit (not shown in FIG. 1) can be provided, which makes possible a variation of the pin length before or even during a case of restraint by the application of low adjustment forces. In this way, the damping effect of the rotation damper 10 can be controlled or regulated. An adaptive system is obtained, in which no axial forces occur at all and only a small bearing friction occurs.

Figure 2:
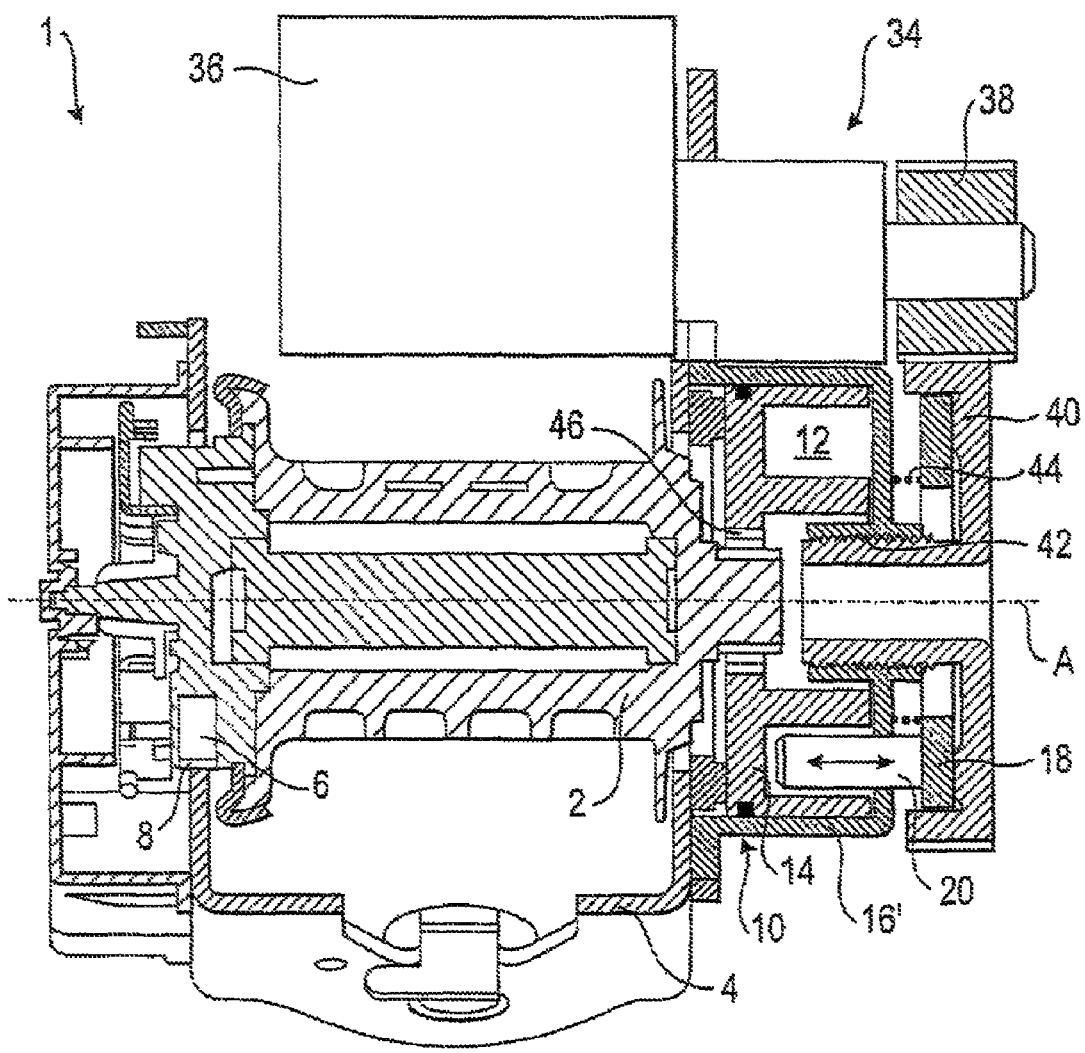
FIG. 2 shows a sectional view of a belt retractor with a slightly modified rotation damper compared with FIG. 1, which is set at a high force level.

In FIG. 2 a belt retractor 1 is illustrated with a rotation damper 10 which is similar to that of FIG. 1. Components which are identical or have an identical function bear the same reference numbers below, and only the differences from the development previously described are entered into.

The rotation damper 10 according to FIG. 2 has a drive 34 for the axial displacement of the pins 20 relative to the housing 14. The drive 34 comprises a motor 36 which drives a pinion 38 which is in engagement with a cup sprocket 40. In the case of a rotation, the cup sprocket 40 is moved in the axial direction of the belt retractor 1, which corresponds to the axial direction A of the rotation damper housing 14, by means of a motion thread 42. The disc 18 lying against the cup sprocket 40 is thereby moved against the prestressing of a spring 44 in the axial direction A, and the pins 20 dip into the working space 12.

In the development shown, the disc 18 is arranged outside the working space 12, and the pins 20 which are fastened thereon project into the working space 12 through a mounting 16', which forms here the element which is rotatable relative to the housing 14. The mounting 16' also serves to delimit the working space towards the disc 18 and is fixed on the retractor housing 4.

In a case of restraint, the housing 14 of the rotation damper 10 is coupled by means of teeth 46 to the belt retractor shaft 2 which is mounted in the retractor housing 4. In the development according to FIG. 2, the housing 14 of the rotation damper therefore rotates, whilst the mounting 16' and the pins 20 with it are not rotatable relative to the retractor housing 4. The coupling of the housing 14 to the shaft 2 takes place by radial deflection of the belt retractor shaft 2 with stress after a locking catch 6 is guided into locking teeth 8 on the retractor housing 4. Alternatively, a coupling of the rotation damper 10 to the retractor housing 4 by a tension drive is also conceivable.

Figure 3:
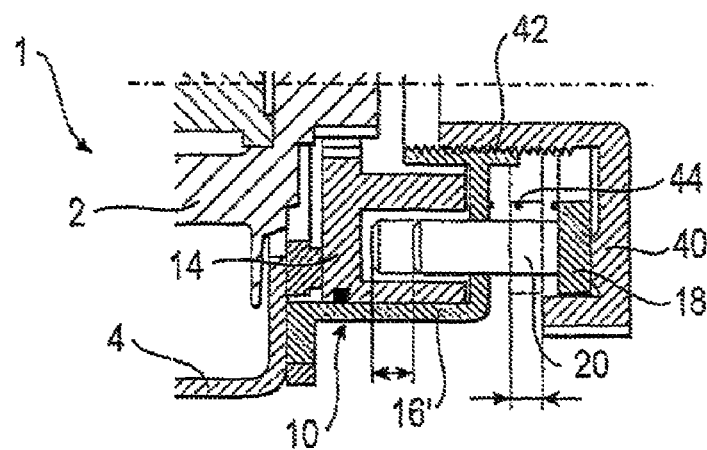
FIG. 3 shows a partial sectional view of the rotation damper of FIG. 2, in which the rotation damper is set at a low force level.

If required, the drive 34 is activated, which moves the disc 18 in the axial direction A and thus permits a mechatronically controlled or regulated alteration to the force level. In FIG. 2, the pins 20 are inserted to a maximum depth into the working space 12, whereby a high force level is produced. In FIG. 3 a position of the disc 18 is shown in which the pins only dip a little into the working space 12. A low force level of the rotation damper 10 is thereby produced. In all the intermediate positions of the cup sprocket 40 and hence of the disc 18, the force levels are continuously adjustable. A variable load limitation characteristic can thereby also be achieved in real time control. A relatively low mechatronic energy is necessary for the axial displacement of the disc 18, for which reason the drive 34 can be of compact construction at a favourable cost. As the damping effect is, in addition, dependent on speed in the rotation damper 10, further force characteristics can be achieved without further adjustment.

Figure 4:
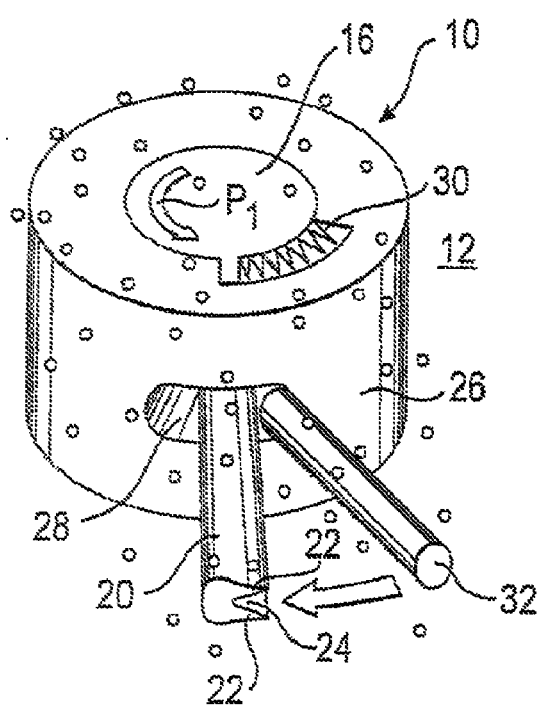

FIG. 4 shows a rotation damper according to a second embodiment of the invention. Again, only the differences from the developments previously described are entered into.

In the rotation damper 10 according to FIG. 4, the pins 20 serving as resistance elements, of which only one is shown in FIG. 2, extend radially to the shaft 16 which forms the element.

The pins 20 each have two formed-on lips 22, with at least the latter consisting of a flexible or an elastic material. An indentation 24 is provided between the lips 22. This indentation 34 is oriented in the direction of rotation of the shaft 16 (see arrow $P_1$). The shaft 16 is surrounded by a ring 26, arranged inside the working space 12, which has several recesses 28 for the pins 20 to pass through and is coupled to the shaft 16 via a spring element 30. The spring element 30 may also be a spiral spring instead of the helical spring which is shown. Several spreading elements 32, likewise constructed as pins, are connected to the ring 26, which project radially from the ring 26 and are arranged such that they can penetrate into the indentations 24 of the pins 20 in the case of a relative rotation between the shaft 16 and the ring 26 (and hence a movement of the spreading elements 32 relative to the pins 20).

Figure 5:
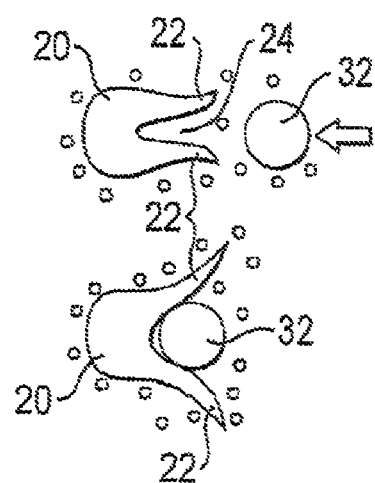
FIG. 5 shows diagrammatically the mode of operation of the spreading elements used in the rotation damper according to FIG. 4.

In a case of restraint, the shaft 16 is coupled to the belt retractor shaft and therefore the torque of the belt retractor shaft which is to be damped is transferred to the shaft 16. The shaft 16, on which the pins 20 are fastened, has a comparatively small mass and hence a small mass moment of inertia. On the other hand, the ring 26 has a large mass and hence a large mass moment of inertia. An acceleration acting on the shaft 16 is transferred by the spring element 30 to the ring 26, which opposes the acceleration more strongly owing to its higher mass inertia. A rotation of the shaft 16 relative to the outer ring 26 therefore takes place, whereby the spreading elements 32 penetrate into the indentations 24 of the pins 20 (see FIG. 5). The lips 22 are thereby spread apart and the damping resistance of the pins 20 increases. With a reducing acceleration, the spring element 30 returns the spreading elements 32 or the pins 20 into a position without or with little additional geometrical resistance again (see FIG. 5 above).

Through the described development, a self-regulating, acceleration-dependent damping effect is achieved.

The invention claimed is:

1. A seat belt retractor comprising:
   a belt retractor shaft (2); and
   a rotation damper (10) to damp the rotary movement of the belt retractor shaft (2) including:
      a housing (14) which delimits a working space (12) filled with a damping medium,
      an element which is rotatable relative to the housing (14), and
      several pins (20) serving as resistance elements, which are provided on the element and extend into the working space (12), the pins (20) having a length that extends in a direction parallel to the rotation axis of the belt retractor shaft (2),
   one of the housing (14) and the element being connected with the belt retractor shaft (2).

2. The seat belt retractor according to claim 1, wherein the pins (20) extend in the axial direction (A) of the housing (14).

3. The seat belt retractor according to claim 1, wherein the pins (20) are arranged on the element so as to be displaceable relative to the housing (14).

4. The seat belt retractor according to claim 1, wherein the element has a disc (18) on which the pins (20) are arranged.

5. The seat belt retractor according to claim 1, wherein the belt retractor shaft (2) rotates relative to the pins (20) to damp rotary movement of the belt retractor shaft (2).

6. The seat belt retractor according to claim 1, wherein the rotation damper (10) has a first condition in which the belt retractor shaft (2) is non-rotatably connected to the housing (14) and a second condition in which the belt retractor shaft (2) is rotatably connected to the housing (14) to damp rotary movement of the belt retractor shaft (2).

7. The seat belt retractor according to claim 1, wherein the rotation damper (10) selectively damps rotary movement of the belt retractor shaft (2).

8. The seat belt retractor according to claim 1, wherein the entire surface area of each pin (20) is exposed to the damping medium.

9. A seat belt retractor comprising:
a belt retractor shaft (2); and
a rotation damper (10) to damp the rotary movement of the belt retractor shaft (2) including:
a housing (14) which delimits a working space (12) filled with a damping medium,
an element which is rotatable relative to the housing (14), and
several pins (20) serving as resistance elements, which are provided on the element and extend into the working space (12), wherein a drive (34) is provided for an axial displacement of the pins (20) relative to the housing (14),
one of the housing (14) and the element being connected with the belt retractor shaft (2).

10. The seat belt retractor according to claim 9, wherein the drive (34) has a motion thread (42) for axially displacing the pins (20) relative to the housing (14).

11. A seat belt retractor comprising:
a belt retractor shaft (2); and
a rotation damper (10) to damp the rotary movement of the belt retractor shaft (2) including:
a housing (14) which delimits a working space (12) filled with a damping medium,
an element which is rotatable relative to the housing (14), and
several pins (20) serving as resistance elements, which are provided on the element and extend into the working space (12), wherein the element on which the pins (20) are provided is positioned outside of the housing (14),
one of the housing (14) and the element being connected with the belt retractor shaft (2).

12. A seat belt retractor comprising:
a belt retractor shaft (2); and
a rotation damper (10) to damp the rotary movement of the belt retractor shaft (2) including:
a housing (14) which delimits a working space (12) filled with a damping medium,
an element which is rotatable relative to the housing (14), and
several pins (20) serving as resistance elements, which are provided on the element and extend into the working space (12), wherein the element on which the pins (20) are provided is not exposed to the damping medium,
one of the housing (14) and the element being connected with the belt retractor shaft (2).

* * * * *